United States Patent Office 3,290,103
Patented Dec. 6, 1966

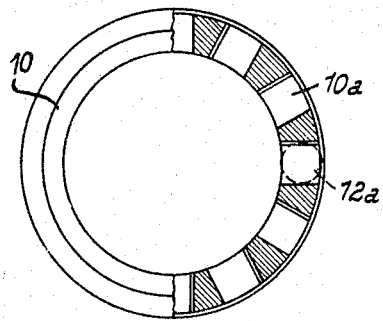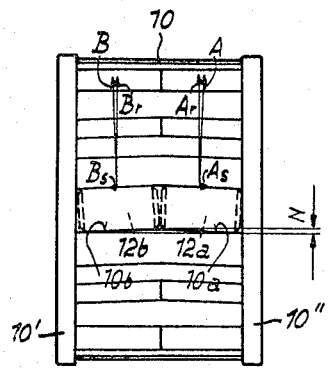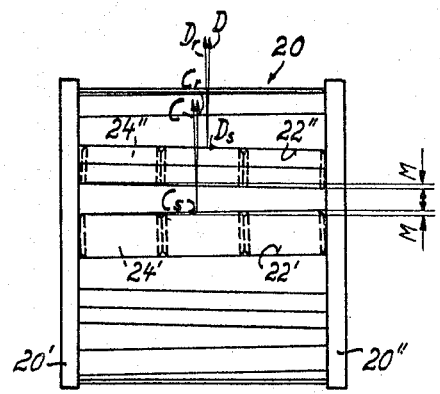

3,290,103
CAGE FOR ROLLER BEARINGS
Erwin Samitz, Bad Fussing, Germany, assignor to Motorenfabrik Hatz G.m.b.H., Passau, Germany
Filed June 18, 1964, Ser. No. 376,100
Claims priority, application Germany, July 15, 1963, M 57,499
3 Claims. (Cl. 308—217)

This invention relates to roller bearings by which term is meant bearings having balls or rollers. For convenience, the following exposition of the invention will be confined to rollers. In particular, the invention is concerned with a cage for a roller bearing having guide slots for accommodating the rollers which are arranged around the cage and extend in the general axial direction of the cage, especially for connecting rod bearings on the crank shaft of an internal combustion engine.

In roller bearings of this kind the rollers have to be inserted into the guide slots with a suitable clearance. As a result, where the guide slots do not lie exactly parallel to the axis of the cage, the drawback arises that the rollers can move within this clearance into positions inclined relatively to the bearing axis and then exert a lateral force, i.e. in the direction of the bearing axis, on the connecting rod. This force is particularly great in roller bearings which are subject to a continual change in the direction and acceleration of the centrifugal forces, as is the case in, for example, connecting rod bearings in internal combustion engines, and here the force causes an undesirable lateral displacement of the connecting rod out of the operating position on the crank shaft pin, and the allied objectionable breakdowns.

It is an object of the present invention to obviate these drawbacks and to provide accurate and safe bearing of a simple construction.

In accordance with the invention, this object is met by the provision of a roller bearing which comprises a cage of annular cross section which is provided with guide slots arranged around the cage and extending in the general axial direction of the cage, and at least one roller disposed in each of said guide slots, in which the axis of each roller is inclined to a radial plane of the cage in a plane perpendicular to this radial plane, the maximum distance of the axis of each roller from the radial plane being 0.1 mm., a number of the rollers in the cage being so inclined in one direction and a substantially equal number of rollers in the cage being so inclined in the opposite direction.

The invention also provides, for a roller bearing, a cage of annular cross section which is provided with guide slots arranged around the cage and extending in the general axial direction of the cage, in one embodiment of which the guide slots are intended to accommodate an odd number of rollers disposed end-to-end, in which each guide slot has parallel longitudinal sides which are inclined to a radial plane of the cage in a plane at right angles to this radial plane, each two adjacent guide slots being so inclined in opposite directions, and in another embodiment of which each of the guide slots has an even number of portions disposed end-to-end and each intended to accommodate a roller, in which the longitudinal sides of each of the portions are inclined to a radial plane of the cage in a plane at right angles to this radial plane, adjacent portions in each guide slot being so inclined in opposite directions.

Two examples of the invention will now be described with reference to the accompanying drawing, in which:

FIGURES 1 and 2 are respectively an end view and side view of the cage of the first example, and FIGURE 3 is a side view of the cage of the second example.

For convenience, the examples of the invention illustrated in the drawing will be described in connection with a roller bearing for a connecting rod on the crank shaft pin of an internal combustion engine.

The roller bearing illustrated in FIGURES 1 and 2 comprises a one-part cage 10, for example of aluminium, which is provided at its ends with annular reinforcing collars 10' and 10" serving to locate the cage in the bearing aperture in the big end of the connecting rod. Disposed between the reinforcing collars is an annular part of the cage which is provided with a plurality of guide slots arranged at regular distances around the cage and extending in the general axial direction of the cage. Two rollers 12a and 12b are inserted end-to-end in each guide slot. These rollers 12a and 12b run on the one hand on the peripheral surface of the crank shaft pin (not shown) embraced by the cage and on the other hand on the inner surface of the bearing aperture in the big end of the connecting rod (also not shown).

In accordance with the invention, each guide slot in the cage has two portions 10a and 10b each with parallel longitudinal sides, the portion 10a being slightly inclined with respect to the bearing axis, i.e. the axis of the cage, in one direction and the portion 10b being slightly inclined to the bearing axis in the opposite direction. That is to say, each portion 10a, 10b is slightly inclined to a radial plane of the cage in a plane at right angles to this radial plane, the directions of inclination of the two portions being opposite. Thus, the portions 10a and 10b are arranged in the form of an arrow which extends in a plane at right angles to the bearing axis.

The amount N of the inclination of each portion to the bearing axis, which is shown exaggerated in FIGURE 2 for the sake of clarity, conforms to the prevailing constructional and operational requirements and from experience, is such that the maximum distance of each portion from the aforesaid radial plane is approximately 0.05 to 0.1 mm. The arrow form and the dimensional accuracy of each guide slot can be easily produced during finishing of the cage by means of a broach of a form and dimensions corresponding to the slot.

Now, let it be assumed that, when using the cage 10 constructed in accordance with the invention with rollers disposed in two annular rows around the cage, each roller 12a in one row is pressed against one of the longitudinal sides of its guide slot 10a during the change in the direction and acceleration of the centrifugal forces and thereby exerts a force A on the cage 10. In addition, each roller 12b in the other row exerts a force B on the cage 10 in a similar fashion. As a result of the arrow-form arrangement of the guide slot, however, the lateral component As of the force A is opposite to the lateral components Bs of the force B, so that the lateral components As and Bs counter-balance each other. This has the effect that no resultant lateral force acts on the connecting rod during running of the bearing, and the connecting rod is accordingly not undesirably displaced out of its correct operating position in one or the other axial direction on the bearing pin of the crank shaft. Thus, no detrimental lateral force, transmitted by the rollers through the cage, acts on the big end of the connecting rod and on the crank shaft. The radial components Ar and Br of the forces A and B exert no lateral forces on the connecting rod and can, therefore, be ignored.

In the second example shown in FIGURE 3 the cage has an odd number of annular rows of rollers disposed around it. Arranged end-to-end in each guide slot 22', 22" in the cage 20, which has two annular reinforcing collars 20' and 20" are three rollers. Thus, the arrangement is that each guide slot 22', 22" has straight longitudinal sides which are inclined to the bearing axis by an amount M, i.e. are inclined to a radial plane of the cage in a plane at right angles to this radial plane. Each two adjacent guide slots, e.g. those shown at 22′ and 22″, are inclined to the bearing axis in directions opposite to one another.

Accordingly, each two adjacent guide slots 22′ and 22″ in the cage 20 are arranged in the form of an arrow extending in a direction parallel to the bearing axis.

The three rollers 24′ in the guide slot 22′ exert a force C on the connecting rod when there is a change in the direction and acceleration of the centrifugal forces, whilst a force D is produced by the three rollers 24″ in the guide slot 22″. The lateral components $C_s$ and $D_s$ of these forces are, in this case, also oppositely acting so that they counter-balance each other. Thus, the connecting rod is not subjected to detrimental lateral forces during operation.

The invention is not limited to the examples illustrated in the drawing. It can be applied to roller bearings having other forms of guide slot with the aim of eliminating the lateral forces. For example, the guide slot arrangement shown in FIGURE 3 can also be used for bearings having one or two rows of rollers around the cage, but always in such a way that a number of guide slots are arranged at an inclination to the bearing axis in one direction and an approximately equal number of other guide slots are inclined to the bearing axis in the opposite direction.

I claim:

1. A roller bearing comprising a cage of annular cross section which is provided with guide slots arranged around the cage and extending in the general axial direction of the cage, and at least one roller disposed in each of said guide slots, in which the axis of each roller is inclined to a radial plane of the cage in a plane perpendicular to this radial plane such that the maximum distance of the axis of each roller from the said radial plane is 0.1 mm., a number of the rollers in the cage being so inclined in one direction and a substantially equal number of rollers in the cage being so inclined in the opposite direction.

2. For a roller bearing, a cage of annular cross section which is provided with guide slots arranged around the cage and extending in the general axial direction of the cage, said guide slots being intended to accommodate an odd number of rollers disposed end-to-end, in which each guide slot has parallel longitudinal sides which are inclined to a radial plane of the cage in a plane at right angles to this radial plane, each two adjacent guide slots being so inclined in opposite directions.

3. For a roller bearing, a cage of annular cross section which is provided with guide slots arranged around the cage and extending in the general axial direction of the cage, each of said guide slots having an even number of portions disposed end-to-end and each intended to accommodate a roller, in which the longitudinal sides of each of said portions are inclined to a radial plane of the cage in a plane at right angles to this radial plane, adjacent portions in each guide slot being so inclined in opposite directions.

References Cited by the Examiner

UNITED STATES PATENTS 1,616,827    2/1927    Runge _____ 308—217

DAVID J. WILLIAMOWSKY, *Primary Examiner.*

FRANK SUSKO, *Examiner.*